US012596663B1

(12) United States Patent
HaiKun et al.

(10) Patent No.: US 12,596,663 B1
(45) Date of Patent: Apr. 7, 2026

(54) DISTRIBUTED DIRECT MEMORY OPERATIONS HAVING DMA ENGINE WITH FRONTEND AND SELECTED BACKEND ACCORDING TO AFFINITY IDENTIFIED BASED ON SELECTED PHYSICAL ADDRESS SPACE

(71) Applicants: Advanced Micro Devices, Inc., Santa Clara, CA (US); ATI Technologies ULC, Markham (CA)

(72) Inventors: Dong HaiKun, Beijing (CN); Xia Fang, Shanghai (CN); Ma XiaoJing, Shanghai (CN); Huang ZengRong, Shanghai (CN); Philip Ng, Markham (CA); Alexander Kaganov, Markham (CA); Anthony Asaro, Markham (CA); Chen Yong, Shanghai (CN); Wang LingLing, Taipei (TW)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 325 days.

(21) Appl. No.: 18/170,433

(22) Filed: Feb. 16, 2023

(51) Int. Cl.
*G06F 13/28* (2006.01)

(52) U.S. Cl.
CPC .................................... *G06F 13/28* (2013.01)

(58) Field of Classification Search
CPC .................................. G06F 13/28; G06F 13/00
See application file for complete search history.

(56) References Cited

U.S. PATENT DOCUMENTS

| | | | | |
|---|---|---|---|---|
| 7,577,813 B2 * | 8/2009 | Nijhawan | ........... | G06F 12/0806 |
| | | | | 711/170 |
| 8,694,698 B2 * | 4/2014 | Mizuno | ................. | G06F 3/0611 |
| | | | | 710/33 |
| 8,904,058 B2 * | 12/2014 | Cardinell | ................ | G06F 13/28 |
| | | | | 710/22 |
| 11,914,519 B2 * | 2/2024 | Inglis | ..................... | G06F 3/0656 |
| 11,977,500 B2 * | 5/2024 | Chiu | .................... | G06F 12/0835 |
| 11,995,351 B2 * | 5/2024 | Greathouse | ............. | G06F 13/28 |
| 12,229,587 B2 * | 2/2025 | Kim | ........................ | G06F 9/544 |
| 2007/0073993 A1 * | 3/2007 | Allen | .................... | G06F 12/121 |
| | | | | 711/170 |
| 2008/0127227 A1 * | 5/2008 | Aloni | .................... | G06F 9/4555 |
| | | | | 719/321 |

* cited by examiner

*Primary Examiner* — Tammara R Peyton

(74) *Attorney, Agent, or Firm* — Greenberg Traurig, LLP

(57) ABSTRACT

The disclosed device includes a direct memory access (DMA) engine having multiple backends and a frontend. The frontend receives a memory operation command, selects one of the backends based on an affinity of the selected backend corresponding to the memory operation command, and instructing the selected backend to perform the memory operation command. Various other methods, systems, and computer-readable media are also disclosed.

20 Claims, 8 Drawing Sheets

Method 600

Start

Receive a memory operation command
602

Select one of the plurality of backends based on an affinity of the selected backend corresponding to the memory operation command
604

Instruct the selected backend to perform the memory operation command
606

End

200

Processor
210

DMA Engine
230

Memory
220

Method
600

Start

Receive a memory operation command
602

Select one of the plurality of backends based on an affinity of the
selected backend corresponding to the memory operation command
604

Instruct the selected backend to perform the memory operation
command
606

End

DISTRIBUTED DIRECT MEMORY OPERATIONS HAVING DMA ENGINE WITH FRONTEND AND SELECTED BACKEND ACCORDING TO AFFINITY IDENTIFIED BASED ON SELECTED PHYSICAL ADDRESS SPACE

BACKGROUND

In computing devices, memory accesses can often present processing bottlenecks. For example, when a processor is performing a read or write operation (e.g., as input/output (I/O) with another component or device), the processor can be fully occupied for the entire duration of the read/write operation. A direct memory access (DMA) engine allows certain subsystems and components to directly access memory independently of the processor. The processor can initiate a transfer with the DMA engine and perform other operations while the DMA engine completes the transfer. The DMA engine can be used for offloading expensive memory operations, including memory-to-memory copying.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
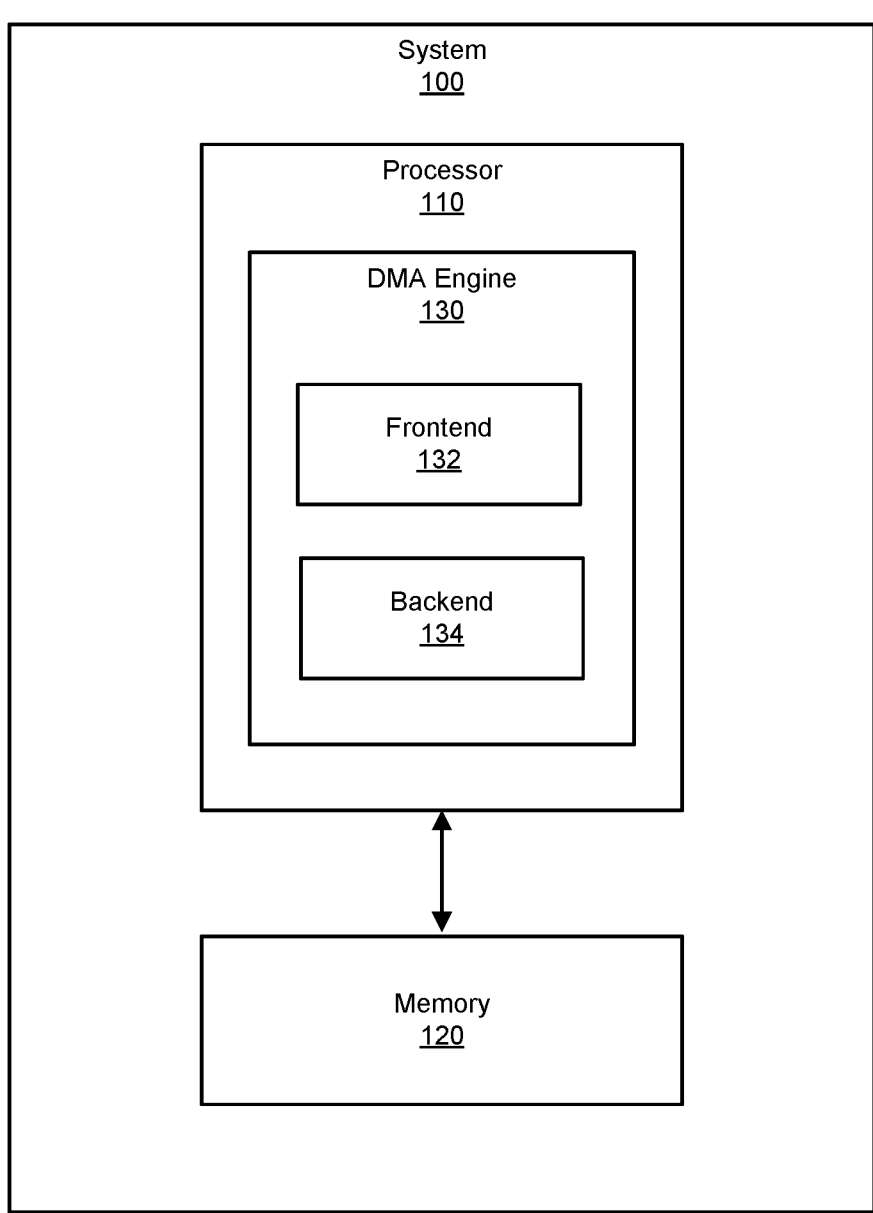
FIG. 1 is a block diagram of an exemplary system for distributed memory operations according to affinity.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to distributed memory operations, and in particular those that use a direct memory access (DMA) engine. As will be explained in greater detail below, implementations of the present disclosure provide a DMA engine having a frontend and one or more backends. The frontend interfaces with, for example, a processor for receiving memory operation requests and coordinating the backends for completing the memory operation. The backends interface with memory components for carrying out the memory operation. By selecting appropriate backends for memory operations with the memory components, the systems and methods described herein can improve the functioning of a computer itself by reducing latency as well as more efficiently distributing memory operation workloads.

As will be described in greater detail below, the instant disclosure describes various systems and methods for a DMA engine having a frontend that selects one or more backends for performing a memory operation based on an affinity (e.g., association with a particular memory component).

In one implementation, a device for distributed memory operations according to affinity includes a direct memory access (DMA) engine including a plurality of backends and a frontend. The frontend is configured to receive a memory operation command, select one of the plurality of backends based on an affinity of the selected backend corresponding to the memory operation command, and instruct the selected backend to perform the memory operation command.

In some examples, the frontend is further configured to split the memory operation command into a plurality of DMA commands. In some examples, the frontend is further configured to select, for each of the plurality of DMA commands, one of the plurality of backends based on affinity and instruct, for each of the plurality of DMA commands, the respective selected one of the plurality of backends to perform the DMA command.

In some examples, selecting one of the plurality of backends further includes translating a logical address for a target memory component of the memory operation command into a physical address. In some examples, selecting one of the plurality of backends further includes determining whether the affinity of the selected backend corresponds to the physical address. In some examples, determining whether the affinity corresponds to the physical address further includes reading, from a register, a range of physical addresses that the backend is configured for and comparing the range of physical addresses to the physical address. In some examples, the range of physical addresses corresponds to a memory component.

In some examples, selecting one of the plurality of backends further comprises selecting the backend based on an availability to perform the memory operation command.

In one implementation, a system for distributed memory operations according to affinity includes at least one physical processor, a plurality of physical memory components, a plurality of registers for storing affinities, and a direct memory access (DMA) engine. The DMA engine includes a plurality of backends each configured to interface with at least one of the plurality of physical memory components and each having an affinity stored in at least one of the plurality of registers and at least one frontend. The frontend is configured to (1) receive, from the at least one processor, a memory operation command, read, from the plurality of registers, at least one affinity for one of the plurality of backends, (2) select a backend of the plurality of backends available for the memory operation command based on an affinity of the selected backend corresponding to the memory operation command, and (3) instruct the selected backend to perform the memory operation command.

In some examples, the frontend is configured to (1) split the memory operation command into a plurality of DMA commands, (2) select, for each of the plurality of DMA commands, a backend of the plurality of backends available for the DMA command based on an affinity of the selected backend corresponding to the DMA command, (3) instruct each selected backend to perform the respective DMA command, and (4) indicate, to the at least one physical processor in response to receiving completion notifications for each of the plurality of DMA commands, completion of the memory operation command.

In some examples, the frontend is further configured to select the available backend by translating, using a universal translation cache (UTC), a logical address for a target memory component of each DMA command into a physical address. In some examples, an affinity comprises a range of physical addresses corresponding to at least one of the plurality of physical memory components. In some examples, selecting the available backend includes comparing the range of physical addresses to the physical address.

In some examples, a distance between at least one backend and its respective physical memory component is less than a distance between the frontend and the physical memory component. In some examples, the physical memory components correspond to at least one of a dynamic random-access memory (DRAM) or a memory interconnect.

In some examples, the memory operation command corresponds to a command to copy data from a first of the plurality of physical memory components to a second of the plurality of physical memory components.

In one example, a method for distributed memory operations according to affinity includes receiving, by a frontend of a direct memory access (DMA) engine, a memory operation command, splitting, by the frontend, the memory operation into a plurality of DMA commands, selecting, by the frontend for each of the plurality of DMA commands, a backend of a plurality of backends of the DMA engine available for the DMA command based on an affinity of the selected backend corresponding to the DMA command, and instructing each selected backend to perform the respective DMA command.

In some examples, the method further includes selecting an available backend by translating, using a universal translation cache (UTC), a logical address for a target memory component of each DMA command into a physical address. In some examples, selecting one of the plurality of backends further includes determining whether the affinity of the selected backend corresponds to the physical address, reading, from a register, a range of physical addresses that the backend is configured for, and comparing the range of physical addresses to the physical address.

In some examples, the range of physical addresses corresponds to one of a plurality of physical memory components. In some examples, the DMA engine includes a plurality of frontends.

In some examples, the method further includes sending, to the frontend from each selected backend, a completion notification of the respective DMA command and indicating, by the frontend in response to receiving completion notifications for each of the plurality of DMA commands, completion of the memory operation command.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of distributed memory operations according to affinity. Detailed descriptions of example systems for distributed memory operations will be provided in connection with FIGS. 1, 3A, 4, and 5. Detailed descriptions of an example DMA engine and a data flow for a memory operation will be provided in connection with FIGS. 2A-2B. Detailed description of an example DMA engine and a data flow for a distributed memory operation will also be provided in connection with FIGS. 3A-3B. Detailed descriptions of variations of DMA engines are provided in connection with FIGS. 4 and 5. Detailed descriptions of corresponding computer-implemented methods will also be provided in connection with FIG. 6.

FIG. 1 is a block diagram of an example system 100 for distributed memory operations according to affinity. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a DMA engine 130, which further includes a frontend 132 and a backend 134. DMA engine 130 corresponds to a circuit that allows certain subsystems and/or components to directly access memory (e.g., memory 120) independently from processor 110. In other words, DMA engine 130 can perform memory operations on memory 120 without processor 110 directly and/or actively processing the memory operations such that processor 110 can perform other operations while DMA engine 130 performs the memory operations. Although the simplified diagram of FIG. 1 illustrates DMA engine 130 as part of processor 110, in other implementations DMA engine 130 can be separate from processor 110, such as a separate circuit and/or a component of another subsystem, processor, device (e.g., as a remote direct memory access (RDMA) engine), etc.

As will be described further herein, frontend 132 corresponds to a circuit that can coordinate memory operations for performing by backend 134, such as by splitting up a memory operation and selecting an appropriate backend based on affinity. As will be described further herein, backend 134 corresponds to a circuit that interfaces with memory 120 for performing memory operations, similar to a granular DMA engine without frontends/backends. In some examples, backend 134 has an affinity for a particular memory component (e.g., interfaces with a particular memory component of memory 120).

In some implementations, affinity refers to a close association and/or affiliation of a backend to its corresponding memory component. A backend can have an affinity for a physically close memory component. The backend can be physically close to its corresponding memory component to improve performance (e.g., by reducing a distance of a signal path). In some examples, affinity can be designated or otherwise identified by physical addresses. For instance, a memory component has a physical address space that, in some implementations, can be further indexed to differentiate from the physical address spaces of other memory components. A backend can be associated with a range of physical addresses that can be a subset of the corresponding memory component's physical address space. Thus, a backend having an affinity for a memory component can be associated with the physical address space of the memory component.

Figure 2A:
FIG. 2A is a diagram of an exemplary DMA engine.
Figure 2A:
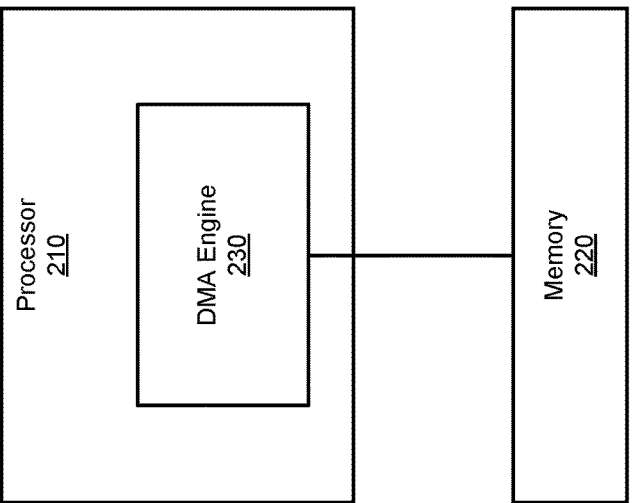

FIG. 2A a system 200 which corresponds to system 100. As illustrated in FIG. 2A, system 200 includes a processor 210 that corresponds to processor 110, a DMA engine 230 that corresponds to DMA engine 130, and a memory 220 that corresponds to memory 120. As further illustrated in FIG. 2A, DMA engine 230 can directly interface with memory 220 for performing memory operations, such as a data copy operation 201 in FIG. 2B.

Figure 2B:
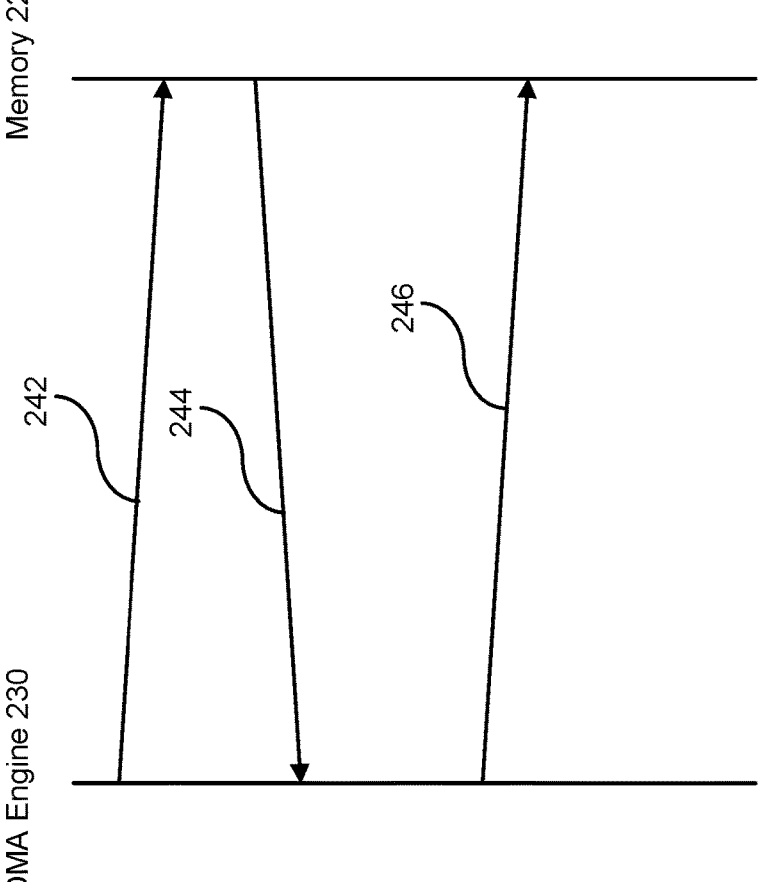
FIG. 2B is a data flow diagram of a copy operation for the DMA of FIG. 2A.
Figure 2B:
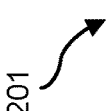

FIG. 2B illustrates a simplified data flow diagram for data copy operation 201 as performed by system 200. After DMA engine 230 receives (e.g., from processor 210 and/or a subsystem thereof) a request for data copy operation 201, DMA engine 230 sends a read request 242 to memory 220 to read the data to be copied. Memory 220 responds with a read operation 244 for DMA engine 230 to read the requested data. To complete the copy operation, DMA engine 230 sends a write request 246 to memory 220 for writing the read data to another location in memory 220.

In system 200, DMA engine 230 interfaces with various types of memory and/or memory interfaces, such as DRAM, an inter-chip global memory interconnect, etc. Depending on where DMA engine 230 is physically located in processor 210, DMA engine 230 can be physically distant from the actual memory component for a given operation, reducing performance. In addition, certain operations, such as a data copy for a large amount of data (e.g., on the order of GBs), can require significant time for completion, utilizing an availability of DMA engine 230 for performing memory operations. Moreover, because DMA engine 230 interfaces with one memory component at a time, other memory operations need to wait for DMA engine 230 even if the corresponding memory component is idle.

Figure 3A:
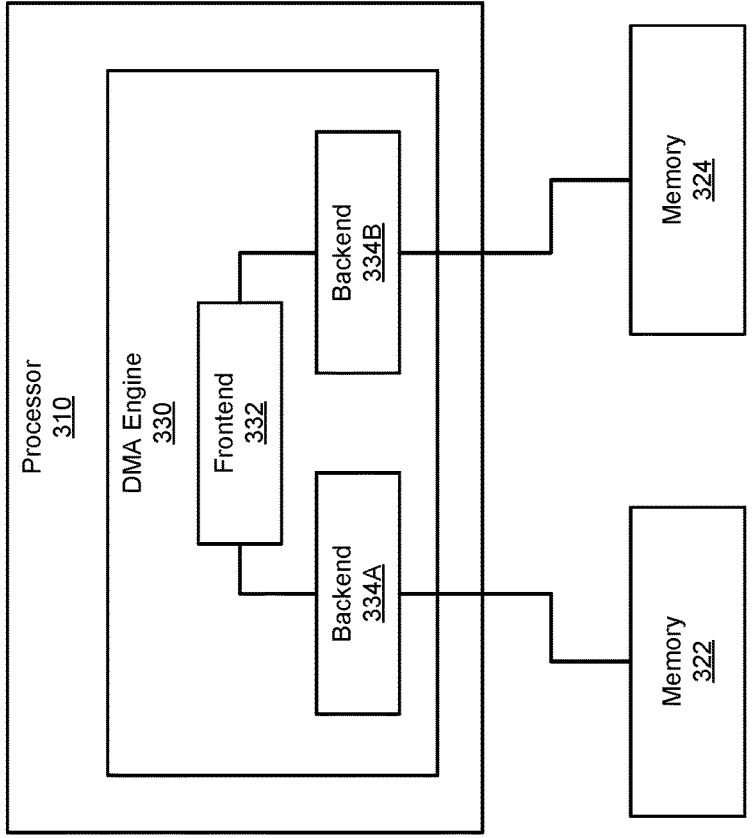
FIG. 3A is a diagram of an exemplary DMA engine having a frontend and a backend.
Figure 3A:
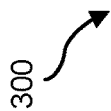

The systems and methods described herein provide a split DMA engine that allows more efficient distributing of memory operations. FIG. 3A shows a system 300 which corresponds to system 100. As illustrated in FIG. 3A, system 300 includes a processor 310 that corresponds to processor 110, a DMA engine 330 that corresponds to DMA engine 130, a memory 322 that can correspond to an iteration, interface and/or component of memory 120, and a memory 324 that can correspond to another iteration, interface and/or component of memory 120. Memory 322 and/or memory 324 can each correspond to various memory components, such as different physical partitions of a memory device (e.g., DRAM), different types of memory, memory interfaces (e.g., a fabric, memory interconnect), etc.

As further illustrated in FIG. 3A, DMA engine 330 includes a frontend 332 that corresponds to frontend 132, a backend 334A that corresponds to an iteration of backend 134, and a backend 334B that corresponds to another iteration of backend 134. Backend 334A can directly interface with memory 322 (e.g., has an affinity for memory 322) for performing memory operations, and backend 334B can directly interface with memory 324 (e.g., has an affinity for memory 324) for performing memory operations.

Figure 3B:
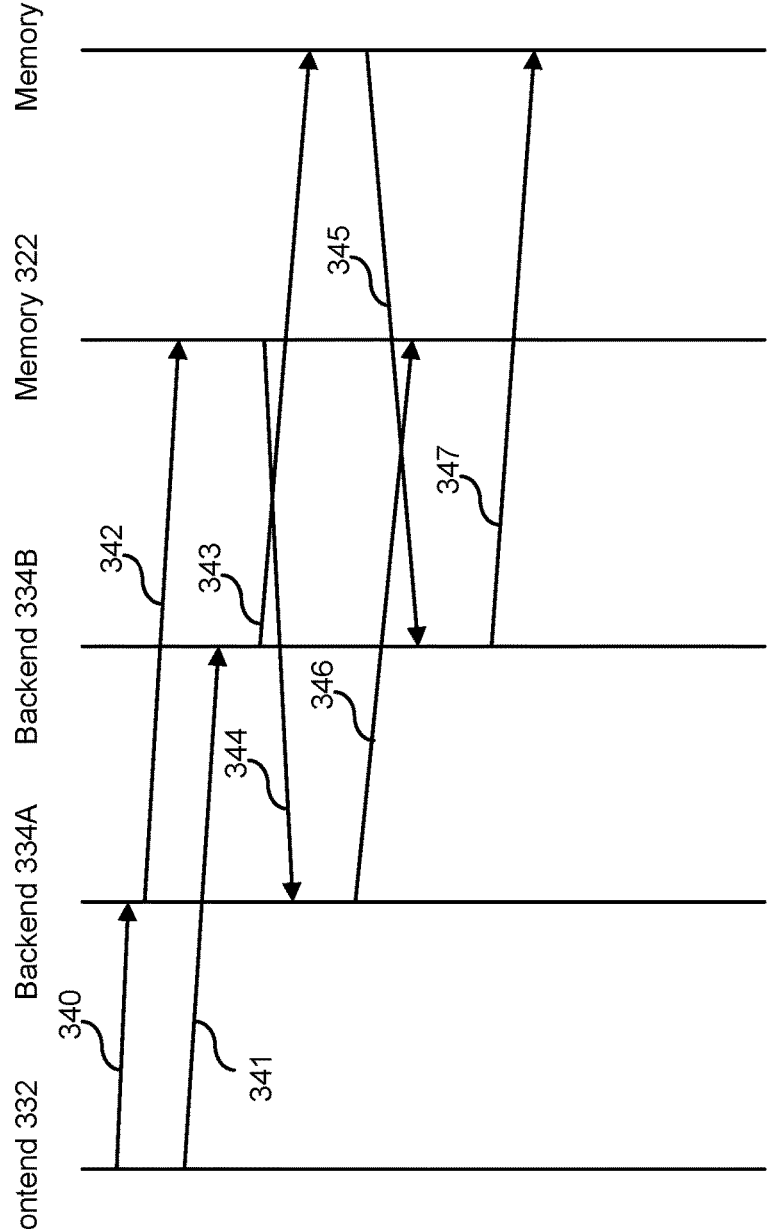
FIG. 3B is a data flow diagram of a copy operation for the DMA of FIG. 3A.

FIG. 3B illustrates a simplified data flow diagram for a memory operation 301 as performed by system 300. After DMA engine 330 and more specifically frontend 332 receives (e.g., from processor 310 and/or a subsystem thereof) a request for memory operation 301, frontend 332 determines which backend(s) (e.g., backend 334A and/or backend 334B) are suitable for completing memory operation 301. Frontend 332 can determine which backend has a corresponding affinity to a target memory component (e.g., a source and/or destination) for the memory operation. The affinities can be based on address ranges such that each backend is associated with a particular address range. For instance, frontend 332 can (using, in some examples, an address translation component) translate a target memory address into a physical address (in some examples, when the target memory address is a virtual/logical address rather than a physical address) to identify a target memory address space for the memory operation. Based on the target memory address space, frontend 332 can determine which backend is affiliated with that address space based on matching the backend's address range (e.g., affinity). In addition, backend affinity can be based on physical proximity of components. Each backend can be adjacent to its respective memory component and closer to the memory component than the frontend. For instance, backend 334A is adjacent to memory 322 and a distance between backend 334A and memory 322 is less than a distance between frontend 332 and memory 322. Backend 334B is adjacent to memory 324 and a distance between backend 334B and memory 324 is less than a distance between frontend 332 and memory 324.

Moreover, in other examples, DMA engine 330 can include multiple backends for a memory component (e.g., multiple backends having affinities for memory 322 or memory 324). When selecting a backend, frontend 332 can select an available backend in order to avoid selecting a backend that is busy. In other examples, DMA engine 330 can also include multiple frontends for managing the various backends.

In FIG. 3B, frontend 332 selects backend 334A and accordingly sends a DMA command 340 to backend 334A. Frontend 332 can send DMA commands to the backends to instruct the backends to interface with their respective memory components (e.g., corresponding to affinity) to perform memory operations. In some examples, the DMA commands are the same or similar to the memory operations received by frontend 332. In some examples, frontend 332 can split a received memory operation into multiple DMA commands for completing the memory operation such that a DMA command can correspond to a portion of the memory operation.

Based on DMA command 340 which can be a copy operation, backend 334A sends a read request 342 to memory 322 to read the data to be copied. Memory 322 responds with a read operation 344 for backend 334A to read the requested data. To complete the copy operation, backend 334A sends a write request 346 to memory 322 for writing the read data to another location in memory 322.

As further illustrated in FIG. 3B, frontend 332 sends a DMA command 341 to backend 334B. DMA command 341 corresponds to another copy operation that frontend 332 split for memory operation 301, although in other examples DMA command 341 can correspond to another memory operation received by frontend 332. Based on DMA command 341, backend 334B sends a read request 343 to memory 324 to read the data to be copied. Memory 324 responds with a read operation 345 for backend 334B to read the requested data. To complete the copy operation, backend 334B sends a write request 347 to memory 324 for writing the read data to another location in memory 324. As shown in FIG. 3B, backend 334B can complete DMA command 341 independently from backend 334A completing DMA command 340.

Figure 4:
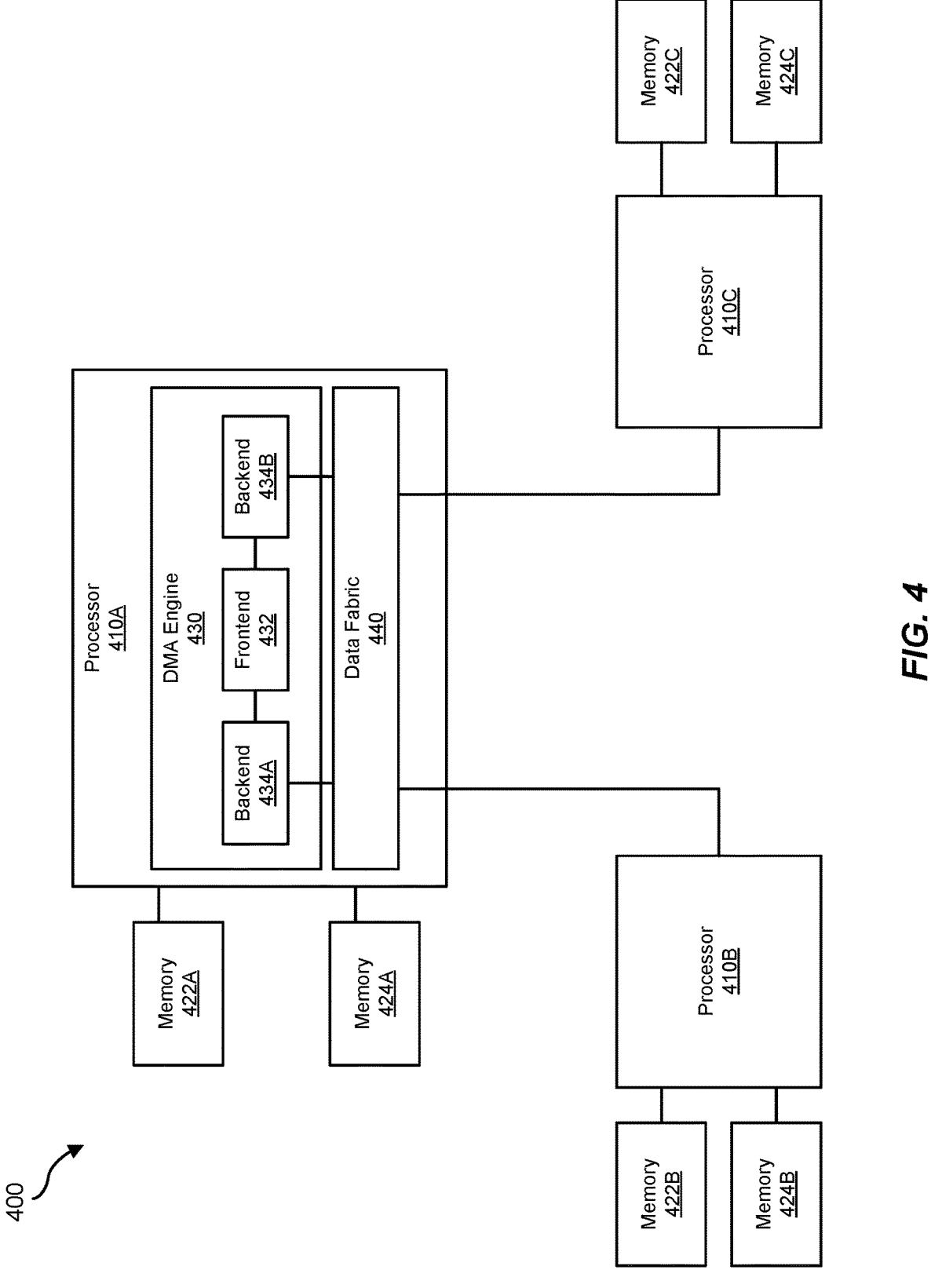
FIG. 4 is a diagram of an exemplary DMA engine supporting cross socket connections.

FIG. 4 shows a system 400 which corresponds to system 100. System 400 includes multiple processors and supports a cross socket connection therebetween. As illustrated in FIG. 4, system 400 includes a processor 410A that corresponds to processor 110, a processor 410B that corresponds to another iteration of processor 110, and a processor 410C that corresponds to yet another iteration of processor 110. As further illustrated in FIG. 4, processor 410A, processor 410B, and processor 410C are communicatively coupled via a memory interface, for instance allowing for data to be sent/received amongst the processors 410A-410C.

Processor 410A includes a memory 422A that can correspond to an iteration, interface and/or component of memory 120, and a memory 424A that can correspond to another iteration, interface and/or component of memory 120. Memory 422A and/or memory 424A can each correspond to various memory components, such as different physical partitions of a memory device (e.g., DRAM), different types of memory, memory interfaces (e.g., a fabric, memory interconnect), etc. Processor 410B includes a memory 422B that can correspond to an iteration, interface and/or component of memory 120, and a memory 424B that can correspond to another iteration, interface and/or component of memory 120. Memory 422B and/or memory 424B can each correspond to various memory components, such as different physical partitions of a memory device (e.g., DRAM), different types of memory, memory interfaces (e.g., a fabric, memory interconnect), etc. Processor 410C includes a memory 422C that can correspond to an iteration, interface and/or component of memory 120, and a memory 424C that can correspond to another iteration, interface and/or component of memory 120. Memory 422C and/or memory 424C can each correspond to various memory components, such as different physical partitions of a memory device (e.g., DRAM), different types of memory, memory interfaces (e.g., a fabric, memory interconnect), etc.

As further illustrated in FIG. 4, processor 410A includes a DMA engine 430 that corresponds to DMA engine 130. DMA engine 430 includes a frontend 432 that corresponds to frontend 132, a backend 434A that corresponds to an iteration of backend 134, and a backend 434B that corresponds to another iteration of backend 134. Processor 410A further includes a data fabric 440 which corresponds to various structures, connections, and control circuits for sending data between memory and cache structures and can serve as a memory interface between processors 410A-410C. Data fabric 440 allows backend 434A and/or backend 434B to perform memory operations between different memory components. Although not illustrated in FIG. 4, each of processors 410B and 410C can also include respective DMA engines (including one or more frontends and backends) and data fabrics.

Backend 434A can, via data fabric 440, interface with processor 410B (e.g., memory 422B and/or memory 424B) and has an affinity for the memory interface for processor 410B (and accordingly has an affinity for memory 422B and/or memory 424B) for performing memory operations. Backend 434B can, via data fabric 440, interface with processor 410C (e.g., memory 422C and/or memory 424C) and has an affinity for the memory interface for processor 410C (and accordingly has an affinity for memory 422C and/or 424C) for performing memory operations.

As described herein frontend 432 can select a backend based on affinity for a target memory component for a memory operation, including a source or a destination of the memory operation. For example, if frontend 432 receives a memory operation command for copying data from memory 422A (of processor 410A) to memory 422B (of processor 410B), frontend 432 can select backend 434A based on the affinity of backend 434A to the destination of this memory operation command (e.g., an affinity for processor 410B and/or memory 422B). Similarly, frontend 432 can select backend 434B for memory operation commands involving processor 410C based on the affinity of backend 434B to processor 410C.

Figure 5:
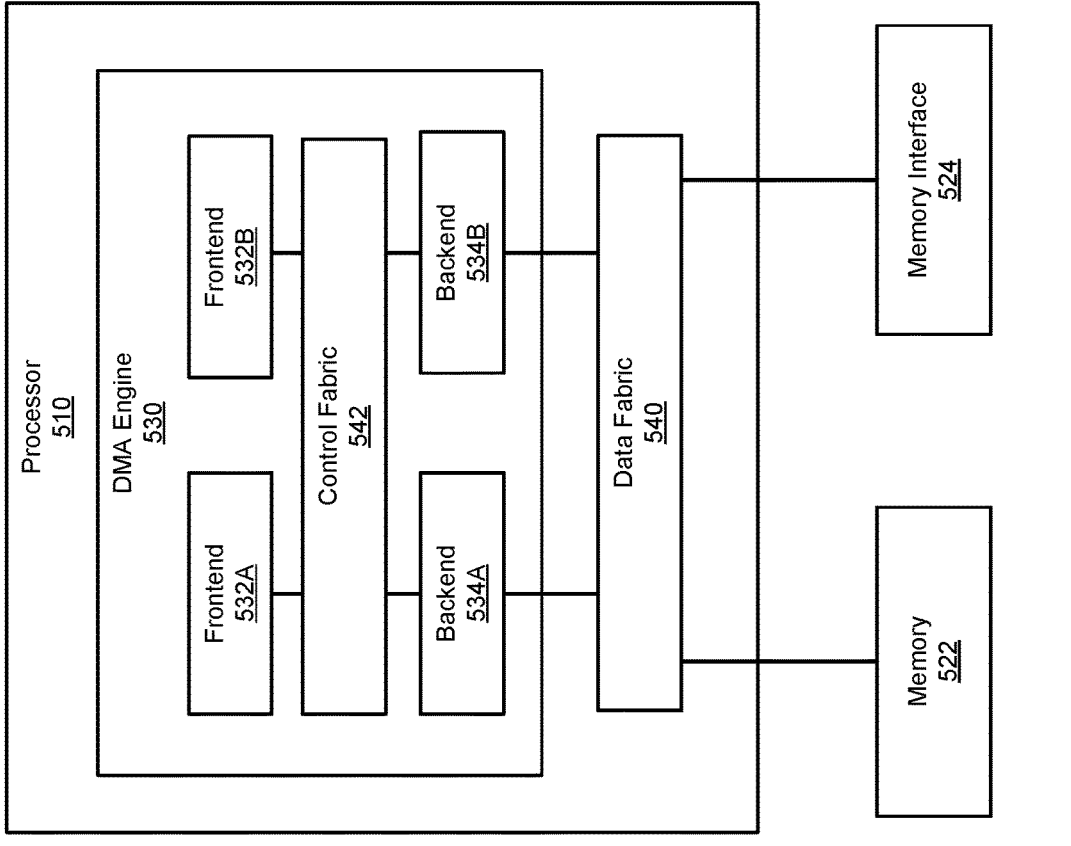
FIG. 5 is a diagram of an exemplary DMA engine with a control fabric.
Figure 5:
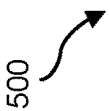

FIG. 5 shows another variation of a system 500 which corresponds to system 100. As illustrated in FIG. 5, system 500 includes a processor 510 that corresponds to processor 110, a DMA engine 530 that corresponds to DMA engine 130, a memory 522 that can correspond to an iteration, interface and/or component of memory 120, and a memory interface 524 that can correspond to another iteration, interface and/or component of memory 120. Memory 522 and/or memory interface 524 can each correspond to various memory components, such as different physical partitions of a memory device (e.g., DRAM), different types of memory, memory interfaces (e.g., a fabric, memory interconnect), etc. In particular, memory interface 524 can correspond to a bus for interfacing with other devices having a memory.

As further illustrated in FIG. 5, DMA engine 530 includes a frontend 532A that corresponds to an iteration of frontend 132, a frontend 532B that corresponds to another iteration of frontend 132, a backend 534A that corresponds to an iteration of backend 134, and a backend 534B that corresponds to another iteration of backend 134. Frontend 532A and frontend 532B can each interface with any of backend 534A and backend 534B via a control fabric 542 that corresponds to an interface for communication between components. Processor 510 further includes a data fabric 540 which corresponds to various structures, connections, and control circuits for sending data between memory and cache structures and can serve as a memory interface between various memory components, such as memory 522 and memory interface 524. Data fabric 540 allows backend 534A and/or backend 534B to perform memory operations between different memory components.

In some examples, backend 534A can, via data fabric 540, interface with memory 522 (e.g., has an affinity for memory 522) for performing memory operations, and backend 534B can, via memory interface 524, interface with various memory devices connected to memory interface 524 (e.g., has an affinity for memory interface 524 and/or memory devices connected thereto) for performing memory operations.

In some implementations, frontend 532A and frontend 532B can select any available backend (e.g., a backend that is idle or otherwise not performing an operation) for performing memory operations. In addition, commands received by DMA engine 530 can be managed by either of frontend 532A and frontend 532B, for instance based on availability and/or affinity (e.g., affinities for components issuing memory operation commands). For example, if DMA engine 530 receives a first copy command for copying data from memory 522 to a memory device coupled to memory interface 524, frontend 532A can select backend 534A, based on its affinity to the source (e.g., memory 522), to perform the first copy command. If DMA engine 530 receives a second copy command for copying data from a memory device coupled to memory interface 524 to memory 522, although frontend 532B can select backend 534A based on its affinity to the destination (e.g., memory 522), backend 534A is busy due to the first copy command. Thus, frontend 532B can select backend 534B based on its affinity to the source (e.g., memory interface 524) as well as its availability.

Although FIG. 5 illustrates two frontends and two backends, in other implementations there can be additional frontends and/or backends. In addition, one or more backends and/or frontends can share the same or similar affinities.

Figure 6:
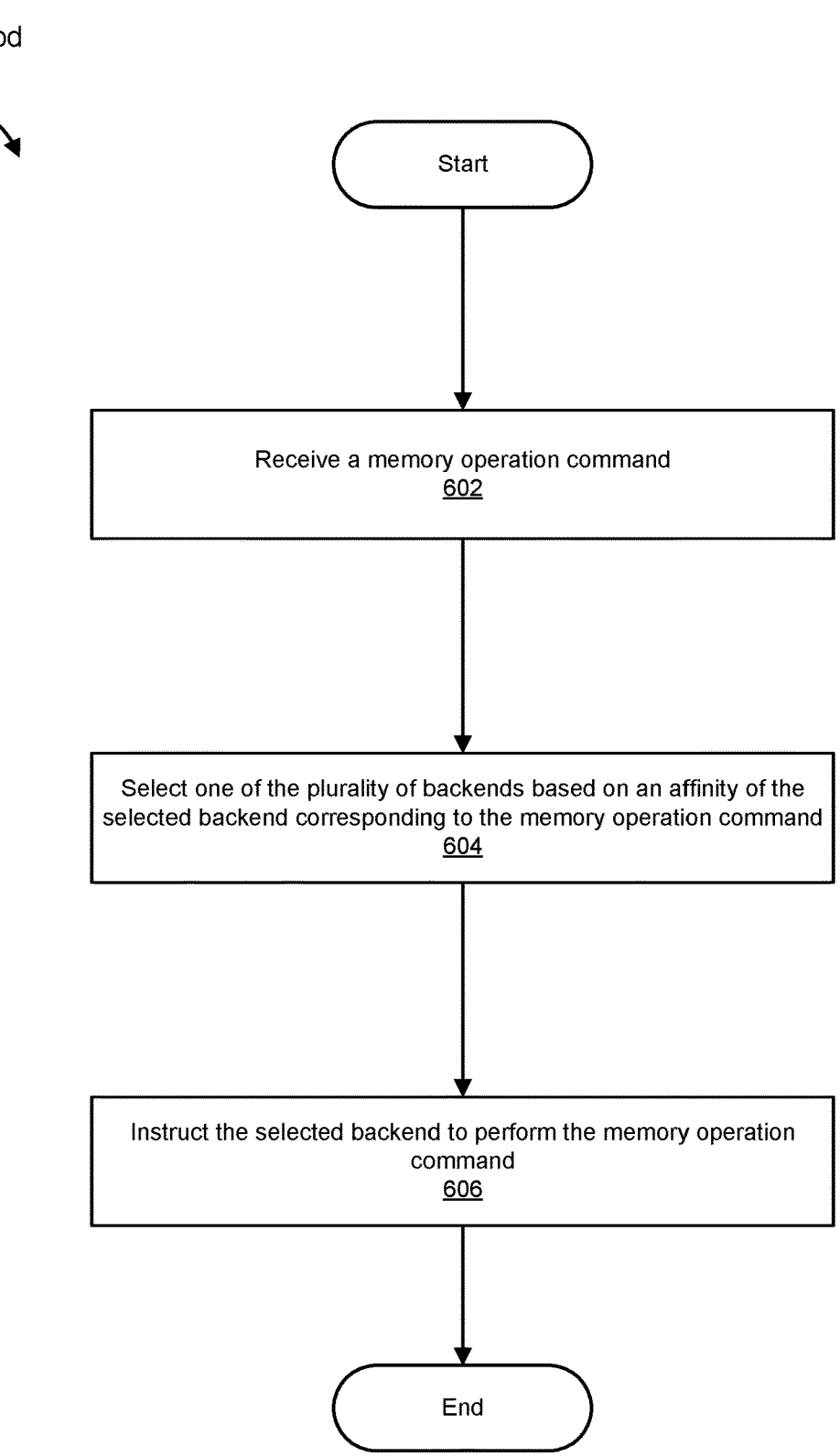
FIG. 6 is a flow diagram of an exemplary method for distributed copy according to affinity.

FIG. 6 is a flow diagram of an exemplary computer-implemented method 600 for distributed memory operations according to affinity. The steps shown in FIG. 6 can be performed by any suitable computer-executable code and/or computing system, including the system(s) illustrated in FIGS. 1, 3A, 4, and/or 5. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein receive a memory operation command. For example, frontend 132 receives a memory operation command, such as a data copy operation.

In some implementations, the term "memory operation" can refer to any type of command and/or operation for a memory, such as a read, write, and/or combinations thereof, such as copying data, moving data, etc.

The systems described herein can perform step 602 in a variety of ways. In one example, the frontend is further configured to split the memory operation command into a plurality of DMA commands. For instance, based on a type and/or complexity of the memory operation command and/or target memory spaces, frontend 132 can split the memory operation command into smaller DMA commands used internally in DMA engine 130 between frontend 132 and backend 134.

At step 604 one or more of the systems described herein select one of the plurality of backends based on an affinity of the selected backend corresponding to the memory operation command. For example, frontend 132 can select backend 134 based on an affinity of backend 134 corresponding to the memory operation command.

The systems described herein can perform step 604 in a variety of ways. In one example, selecting one of the plurality of backends further included translating a logical address for a target memory component of the memory operation command into a physical address. For instance, frontend 132 can use an address translation circuit such as a universal translation cache (UTC) to translate the logical address into the physical address. In other examples, the memory operation command can include physical addresses such that translation is not needed. In some examples, selecting one of the plurality of backends further includes determining whether the affinity of the selected backend corresponds to the physical address. Frontend 132 can use the physical address for determining whether the affinity of backend 134 is appropriate.

In some implementations, determining whether the affinity corresponds to the physical address further includes reading, from a register, a range of physical addresses that the backend is configured for and comparing the range of physical addresses to the physical address. For example, frontend 132 can read the affinity of backend 134, represented by a range of physical addresses, from a register of backend 134. The range of physical addresses can correspond to a memory component such as memory 120. If the target physical address is within the range of physical addresses, the corresponding backend can be selected.

In some examples, selecting one of the plurality of backends further includes selecting the backend based on an availability to perform the memory operation command. For instance, if backend 134 is currently busy performing an operation, frontend 132 can select another backend having the appropriate affinity and is currently idle. In other examples, frontend 132 can wait for backend 134 to become available.

In some examples, after splitting the memory operation into DMA commands, frontend 132 can select, for each of the plurality of DMA commands, one of the plurality of backends based on affinity.

Continuing to step 606, one or more of the systems described herein instruct the selected backend to perform the memory operation command. For example, frontend 132 instructs backend 134 to perform the memory operation command.

The systems described herein can perform step 606 in a variety of ways. In one example, frontend 132 instructs, for each of the plurality of DMA commands, the respective selected one of the plurality of backends to perform the DMA command. The backends can send to frontend 132, a completion notification of their respective DMA commands. Frontend 132 can, in response to receiving completion notifications for the DMA commands, indicate completion of the memory operation command. Thus, frontend 132 can coordinate multiple backends for performing DMA commands to complete the memory operation.

As detailed above, certain memory operations such as data copy operations often use direct memory access (DMA) engine to generate a read request for the source address and write the returned read data to the destination address. The data first moved or copied to the DMA engine and then written to the destination. The present disclosure provides a centralized DMA frontend engine for virtual to physical address translation, and to decide an input/output (IO) affinity according to the source/destination addresses and offload the copy operation to the most proper DMA backend engine based on the affinity.

With this split DMA architecture, the DMA frontend engine can choose the backend engine which is closest to the source/destination memory channel, to reduce a data movement path thereby improving performance and reducing power. Because the DMA frontend engine and backend engine are split, one frontend engine can submit the copy operation to multiple backend engines which can significantly improve data movement performance.

The split DMA architecture is a system level architecture that can improve the efficiency of data movement and other accelerator offload functions for both discrete GPUs and processors. The architecture is based around separate DMA frontends and backends which can be scaled and configured separately based upon needs. This can lead to greater implementation efficiency and allows for affinity-based transfers which reduces DF utilization and consequently saves power.

DMA frontends can be specific to each DMA software programming model. They can be responsible for processing descriptors, performing address translation, and performing other control functions. A frontend can perform some operations directly, while offloading other operations to shared DMA back-ends. DMA backends are shared resources for high-bandwidth DMA offloading from the various frontends.

In order to perform affinity-based transfers, the frontends can each calculate an optimal backend to perform an operation and offload the operation over a bus to that backend. The backends can generate bulk DMA over the main data fabric and can be physically positioned near the I/O interfaces to reduce the distance and power to send data over the associated interface. Memory (e.g., a local memory to the I/O transfer) can be of average distance from each I/O interface due to memory interleaving.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a direct memory access (DMA) engine comprising:
a plurality of backends; and
a frontend configured to:
receive a memory operation command;
select one of the plurality of backends based on an affinity of the selected backend corresponding to the memory operation command, wherein the affinity is identified based on a physical address space; and
instruct the selected backend to perform the memory operation command.

2. The device of claim 1, wherein the frontend is further configured to split the memory operation command into a plurality of DMA commands.

3. The device of claim 2, wherein the frontend is further configured to:
select, for each of the plurality of DMA commands, one of the plurality of backends based on affinity; and
instruct, for each of the plurality of DMA commands, the respective selected one of the plurality of backends to perform the DMA command.

4. The device of claim 1, wherein selecting one of the plurality of backends further comprises translating a logical address for a target memory component of the memory operation command into a physical address.

5. The device of claim 4, wherein selecting one of the plurality of backends further comprises determining whether the affinity of the selected backend corresponds to the physical address.

6. The device of claim 5, wherein determining whether the affinity corresponds to the physical address further comprises:
reading, from a register, a range of physical addresses that the backend is configured for; and
comparing the range of physical addresses to the physical address.

7. The device of claim 6, wherein the range of physical addresses corresponds to a memory component.

8. The device of claim 1, wherein selecting one of the plurality of backends further comprises selecting the backend based on an availability to perform the memory operation command.

9. A system comprising:

at least one physical processor;

a plurality of physical memory components;

a plurality of registers for storing affinities; and a direct memory access (DMA) engine comprising:

a plurality of backends each configured to interface with at least one of the plurality of physical memory components and each having an affinity stored in at least one of the plurality of registers; and at least one frontend configured to:

receive, from the at least one processor, a memory operation command;

read, from the plurality of registers, at least one affinity for one of the plurality of backends;

select a backend of the plurality of backends available for the memory operation command based on an affinity of the selected backend corresponding to the memory operation command, wherein the affinity is identified based on a physical address space; and instruct the selected backend to perform the memory operation command.

10. The system of claim 9, wherein the frontend is configured to:

split the memory operation command into a plurality of DMA commands;

select, for each of the plurality of DMA commands, a backend of the plurality of backends available for the DMA command based on an affinity of the selected backend corresponding to the DMA command;

instruct each selected backend to perform the respective DMA command; and indicate, to the at least one physical processor in response to receiving completion notifications for each of the plurality of DMA commands, completion of the memory operation command.

11. The system of claim 10, wherein:

the frontend is further configured to select the available backend by translating, using a universal translation cache (UTC), a logical address for a target memory component of each DMA command into a physical address;

an affinity comprises a range of physical addresses corresponding to at least one of the plurality of physical memory components; and selecting the available backend comprises comparing the range of physical addresses to the physical address.

12. The system of claim 11, wherein a distance between at least one backend and its respective physical memory component is less than a distance between the frontend and the physical memory component.

13. The system of claim 11, wherein the physical memory components correspond to at least one of a dynamic random-access memory (DRAM) or a memory interconnect.

14. The system of claim 11, wherein the memory operation command corresponds to a command to copy data from a first of the plurality of physical memory components to a second of the plurality of physical memory components.

15. A method comprising:

receiving, by a frontend of a direct memory access (DMA) engine, a memory operation command;

splitting, by the frontend, the memory operation into a plurality of DMA commands;

selecting, by the frontend for each of the plurality of DMA commands, a backend of a plurality of backends of the DMA engine available for the DMA command based on an affinity of the selected backend corresponding to the DMA command, wherein the affinity is identified based on a physical address space; and instructing each selected backend to perform the respective DMA command.

16. The method of claim 15, further comprising selecting an available backend by translating, using a universal translation cache (UTC), a logical address for a target memory component of each DMA command into a physical address.

17. The method of claim 16, wherein selecting one of the plurality of backends further comprises:

determining whether the affinity of the selected backend corresponds to the physical address;

reading, from a register, a range of physical addresses that the backend is configured for; and comparing the range of physical addresses to the physical address.

18. The method of claim 17, wherein the range of physical addresses corresponds to one of a plurality of physical memory components.

19. The method of claim 15, wherein the DMA engine comprises a plurality of frontends.

20. The method of claim 15, further comprising:

sending, to the frontend from each selected backend, a completion notification of the respective DMA command; and indicating, by the frontend in response to receiving completion notifications for each of the plurality of DMA commands, completion of the memory operation command.

* * * * *